UNITED STATES PATENT OFFICE.

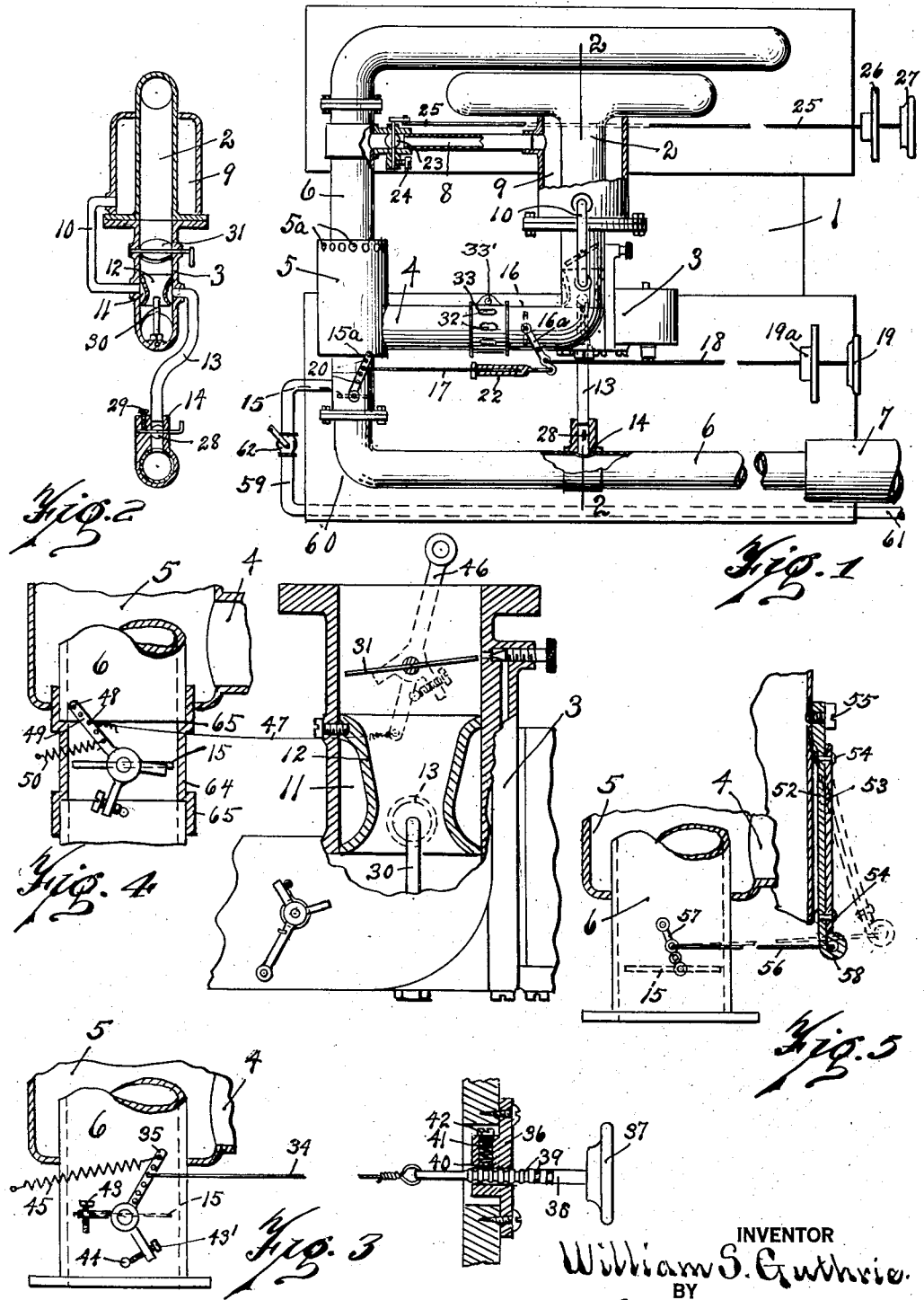

WILLIAM S. GUTHRIE, OF TERRELL, TEXAS.

CONTROLLING MECHANISM FOR EXHAUST-GASES OF INTERNAL-COMBUSTION ENGINES.

1,359,168.  Specification of Letters Patent.  Patented Nov. 16, 1920.

Application filed January 29, 1920. Serial No. 354,864.

*To all whom it may concern:*

Be it known that I, WILLIAM S. GUTHRIE, a citizen of the United States, and residing at Terrell, in the county of Kaufman and State of Texas, have invented a new and Improved Controlling Mechanism for Exhaust-Gases of Internal-Combustion Engines, of which the following is a specification.

This invention relates to devices for heating internal combustion engines, especially automotive and marine engines, and its primary object is to provide means to accelerate the warming up of the engine, and maintain a good working temperature of the same while running at slow speeds, so that the engine may operate economically in cold weather without necessitating the installation of the expensive and complicated apparatus now often in use, of which complicated exhaust passages having various kinds of by-passes for the exhaust gases, shutters in front of the radiators, and thermostats in the water line are examples.

The objects of this invention are accomplished by having a damper or valve positioned in the main exhaust passage so that it may be operated to throttle the flow of the exhaust gases from the engine. The construction of the damper is such that it may be held in any desired position by a lock screw, or it may be positioned by having a control rod leading from the damper to a point near the driver's seat of an automobile, so that when the motor is cold, the driver can readily close the damper or set the same in any position necessary to regulate the temperature of the motor. When the atmospheric temperature is below zero the damper may need to be closed more than in milder weather, in order to maintain the normal temperature of the motor while running at moderately slow speeds, such as that of a motor for an automobile running at speeds under twenty miles per hour.

The damper may also be operated automatically as by a thermostat; or it may be operated in conjunction with either the choke valve or the throttle valve as more fully described later on.

This invention especially consists of certain details of construction shown in the accompanying drawings and more fully described and pointed out in the claims.

The usual construction of exhaust manifolds, or pipes, is such that the hot exhaust gases are carried away from the engine very promptly in order to prevent over-heating of the engine during hot weather. The usual exhaust passage is therefore made larger than is necessary for carrying off the exhaust gases during cold weather, so by inserting my damper, or valve, in the main exhaust passage, I am able to hold back the hot gases sufficiently to heat the engine quickly, by partially closing the valve and at the same time permit the gases to escape fast enough to insure good performance of the engine. I have provided various adjustments so that the damper may be held in wide open position in summer and by changing the adjustment the damper may be held partially closed for use in cold weather.

In the drawings, Figure 1 is a side elevation of an internal combustion engine having an exhaust manifold and an intake manifold partly in section and illustrating the invention. Fig. 2 shows a sectional view of the intake manifold and carbureter on line 2—2 of Fig. 1. Fig. 3 illustrates an independent control for the damper valve. Fig. 4 is a section of the damper valve operatively connected to the throttle of a carbureter and the heating chamber about the venturi. Fig. 5 illustrates the damper valve being controlled automatically by a thermostat.

Similar reference characters refer to like parts throughout the several views.

Referring to Figs. 1 and 2, the engine 1 has an intake or fuel passage consisting of the pipe 2, the charge forming device or carbureter 3, the hot air pipe 4, and the air heater or stove 5. The main exhaust passage 6 conveys away the exhaust gases from the engine, preferably to the muffler 7. An auxiliary passage 8 conveys hot exhaust gases from the pipe 6 to the heating chamber 9 which surrounds a part of the intake manifold 2, and the pipe 10 conveys the exhaust gases from the latter chamber to the chamber 11 around the venturi 12, better shown in Fig. 2. The pipe 13 conveys these exhaust gases from the chamber 11 to the main exhaust passage at 14. The pipe 13 may be omitted when desired to permit the gases to escape into the atmosphere from the chamber 11, or a pipe of greater length than shown may be used to convey the gases away from the chamber 11 and discharge the same into the atmosphere at a distant point so as to minimize the noise and smoke; but it is preferred to return the gases to the main exhaust passage 6 when convenient to do so, because this makes a clean and less noisy job.

The valve or damper 15 is positioned in the main exhaust passage 6 at a point below the stove 5 so that when the damper is closed, or partially closed, it will retard the flow of the exhaust gases through the main exhaust passage and cause that portion of the passage between the damper 15 and the engine 1 to be highly heated. Thus holding the exhaust gases in the regular exhaust passage permits rapid heating of the engine block, and positioning the stove or air heater 5 between the engine and the damper 15 accelerates the warming up of the intake air for the carbureter and constitutes an important feature of the invention because considerable time is thereby saved in warming up a cold engine, and the installation expense is practically nominal, as the structure of the exhaust passage is unchanged.

When heating jackets or chambers are provided for heating the intake or suction passage by the exhaust gases, such for example as that shown in Figs. 1 and 2, and these are connected with the main exhaust passage between the damper and the engine, as shown, it will follow that the closing of the damper for the purpose of accelerating the heating of the air heater 5 will also increase the flow of the exhaust gases through the heating chambers 9 and 11, which materially assists in the warming up of the engine. Accelerating the flow of the exhaust gases through the auxiliary passages and heat chambers also tends to keep said passages and chambers from clogging up with the gummy substance usually carried into such passages by the exhaust gases, and these when circulating through said passages when the damper 15 is closed are so much hotter than formerly that they burn any deposits that may have collected in said passages, and for this purpose alone the damper 15 is of great value. The damper 15 may be controlled in a number of ways, some of which are shown in the drawings.

In Fig. 1 the damper 15 is connected with the choke valve 16 of the carbureter by means of an adjustable connecting rod 17, the rod 17 being pivoted to the levers 16a and 15a of the choke valve and damper respectively. The choke valve 16 is preferably controlled from a distant point by a wire or rod 18, supported by a bracket 19a and having connection with a controlling member 19 so that the choke valve may be opened and closed from a convenient point. The connection between the choke valve and the damper 15 is such that when the choke valve is closed the damper may be set either fully closed or partially closed to meet differing conditions.

After the engine is started, the choke valve 16 should be partially opened to admit some air to the engine so it will continue to run, and the damper should be kept partially closed until the motor warms up. By thus connecting the damper 15 to the choke valve 16 I am enabled to heat both the engine block and the intake passage very quickly when running the engine with the choke valve partly closed. After the engine is thus warmed up, with the choke valve partly closed, a loading up condition will be noticed as usual, and this notifies the operator that the choke valve should be opened. When the choke valve is opened it also causes the damper 15 to open to the adjusted position, which in summer may be wide open and in winter its open position may be such that the valve will retard the flow of the gases to some extent, depending upon the weather conditions. The holes 20 in the lever 15a and the adjustment 22 for varying the length of the rod 17, provide for any possible adjustment of these two valves in relation to each other. In fact, the relation may be such that the damper is practically closed when the choke valve is partly open.

The valve 23 controls the flow of the exhaust gases through the auxiliary exhaust passage 8, and provides means for closing off the circulation of these gases when desired, so that if the heat becomes too great in warm weather the valve 23 may be closed or partly closed. The lock screw 24 provides means for holding this valve in adjusted position, or a control rod 25 may be employed to operate this valve from a distant point where the bracket 26 and button 27 may be conveniently located. A valve 28 positioned near the lower end of the conduit 13 may also be closed when desired to prevent the circulation of the exhaust gases. The lock screw 29 provides means for holding the valve 28 in the desired position.

Air enters the stove or heater 5 through the ports 5a and flows around the exhaust pipe 6 and is heated thereby. It then flows through the pipe 4 to the air intake of the carbureter 3 and up through the venturi 12 where it picks up fuel from the nozzle 30, and passing the throttle 31 flows to the engine 1 through the intake manifold 2. The air ports 32 and shutter 33 provide means for regulating the temperature of the intake air. The shutter 33 as shown is a flexible metallic band having air ports to register with the ports 32 when in the open position. The bolt 33' is employed to fasten the ends of the band 33 together so as to tighten the same around the air passage so that the adjustment of the air admission ports 32 will not be changed by the vibration of the motor. This means for regulating the temperature of the intake air is shown as an example of a suitable regulating means, but it is intended that any other means for admitting air to the air intake passage may be employed in connection with the invention when desired.

I prefer to control the air admission device irrespective of the mixture throttling means like has been done in the past. By having this air admission device controlled independent of the throttle enables me to shut off cold air in winter and results in a smooth running motor when accelerating the speed quickly, whereas if the air ports 32 were so controlled that they would open simultaneously with the throttle, the results would not be nearly so desirable.

Sometimes the heating chambers 9 and 11 around the intake manifold and the venturi may be eliminated, or only one of these chambers may be used as may be desired.

The damper valve 15 may be provided with means (not shown) so it may be fixed in any desired position (similar to the screw 29 for holding the valve 28 in Fig. 2), and in which event the damper may be set partially closed for winter use, and wide open for summer use, without any other controlling means. Or it may be more convenient to connect the valve 15 directly to the control member 19 by a separate wire in place of having the rod 17 connect the two valves 15 and 16 directly together.

In Fig. 3 the damper 15 is controlled by a wire 34 extended from the damper lever 35 to the support 36 and control button 37, having a stem 38 with a series of grooves 39. The bracket 36 is provided with a locking device consisting of a ball 40 and spring 41. A screw plug 42 holds the spring compressed against the ball so that the ball fits in the grooves 39 sufficiently tight to hold the stem in any desired position. The button 37 is provided to push and pull the stem 38 through the bracket 36, to effect an adjustment of the damper 15. This bracket and button makes a simple controlling device for the damper 15, but there are numerous other controlling devices that may be used for the same purpose. The damper lever 35 is provided with two set screws 43 and 43' and a stop 44, which may be used to limit the movement of the damper 15 in both the open and closed positions.

The coiled spring 45 tends to open the damper valve 15, so that when the button 37 is pushed in (to the left) the spring 45 will pull the valve 15 open, or as much open as the adjusting screw 43 will permit. If for any reason the wire 34 should become disengaged, the spring 45 will hold the valve 15 open and prevent the exhaust gases over-heating the engine. This feature of preventing the exhaust gases from overheating the engine may be applied to the several figures of the drawing when desired, by having a spring 45 similarly arranged to hold the valves 15 open when disengaged from their respective operating means.

It may be desirable to substitute a rod for the wire 34, and in which event the spring 45 may be eliminated, but it is preferred to employ the spring 45 even when a stiff rod is substituted for the wire 34, so as to insure against overheating of the engine should the valve 15 become disengaged from its operating means.

In Fig. 4 the damper 15 is connected with the throttle lever 46 by means of a wire 47. One end of the wire 47 is fastened to one of the holes 48 in the damper lever 49, and the other end of the wire is fastened to the lower arm of the throttle lever 46, so that the opening movement of the throttle will open the damper valve 15. The coiled spring 50 tends to close the damper 15. The wire 47 is preferably arranged so that some slack is permitted when the throttle 46 is near the closed position. By this means I am enabled to keep the damper 15 in the normally closed position while running the engine at such slow speeds as the opening of the throttle permits before the slack is taken up in the wire 47, and which speeds may be determined by the amount of slack in the wire 47.

The wire may be arranged without having any slack, so that the damper 15 moves with every movement of the throttle 46, or a stiff rod similar to the rod 17 shown in Fig. 1 may be substituted for the wire 47. The holes 48 provide means for varying the ratio of movement between the throttle valve 46 and the damper 15, so that the throttle 46 may have some opening movement without imparting movement to the damper 15, and at the same time the adjustment may be such that the damper 15 will be wide open when the throttle 46 is wide open. It may sometimes be desired to move the damper slower than the throttle so that the damper does not open as wide as the throttle, particularly in cold weather use, which is provided for by the additional holes 48. Again in hot weather it may be desirable to have the damper 15 arranged so that the ratio of movement between it and the throttle is such that when the throttle is closed to idle the engine, the damper will be nearly fully open, and when the throttle is fully open the damper will also be fully open. The valve 15 having the spring 45 tending to open the same as shown in Fig. 3 may be substituted for the valve 15 shown in Fig. 4, when desired to insure against the overheating of the engine as above described, in which case the wire 47 should be attached to the throttle lever arm 46 above the valve 31, so that the opening movement of the throttle will permit the spring to open the valve 15.

In Fig. 5 the damper 15 is controlled automatically by a simple form of thermostat, so that when the thermostat is sufficiently heated (by being placed in a suitable location, such as against the heat jacket 9 around the intake manifold 2), it will open the damper 15. This thermostat is made of two flat pieces of metal 52 and 53 riveted together at each end at 54, and secured against the wall of the heat jacket 9 by a screw 55. The piece 52 is of metal which expands much faster than the piece 53 so that when sufficient heat is applied, the two pieces will bend as indicated by dotted lines and cause the valve 15 to open. The rod 56 is connected to the damper lever 57 and to the lower end of the thermostat at 58.

The outside diameter of the removable venturi 12 is reduced between its ends as shown in Figs. 1, 2 and 4, so that a chamber 11 is formed when the venturi is fitted into the body of the carbureter 3. The body of the carbureter 3 is provided with inlet and outlet ports connecting to the pipes 10 and 13 for applying exhaust gases to the chamber 11 for heating that portion of the suction passage. Or the chamber 11 may be formed by having the carbureter body enlarged at the point where the diameter of the venturi is reduced. Usually heat chambers are formed in the carbureters by means of separate cores, the venturi being made integral in forming the body castings, which are more costly than the constructions shown in the present case, and in some previous constructions the Venturi tube employed is very small and is used to pass only a small portion of the air supply. Carbon sometimes fills the jackets around the Venturi tube, and when the latter is made so it can be removed, it is an easy matter to clean out carbon deposits.

The size of the valve 15 may be such that it will close the main exhaust passage 6 entirely, or this valve may be somewhat smaller than the exhaust passage so that some exhaust gases may flow by the same when in the closed position.

At the present time a number of manufacturers of automobiles use air heaters for heating the carbureter intake air prior to its reaching the fuel nozzle. The heaters commonly used vary somewhat in design, some are nothing more than a metal housing around the exhaust passage, similar to the heater 5, clearly shown in Fig. 1, others are made integral with the exhaust manifold, and some are of other design. It will be observed that these manufacturers can apply this invention to their present equipment by simply installing a valve 15 in their regular exhaust passage, so that the closing of the valve will retard the flow of exhaust gases from that part of the exhaust passage, where the heater is positioned.

It has been found that the motor may be warmed up to a perfect working condition in cold weather by the use of my invention without materially heating the circulating water. This feature saves considerable expense and trouble resulting from the evaporation of the non-freezing fluids in the radiator due to heating contrivances now in use which depend upon the heat of the water to warm up the motor.

The auxiliary exhaust passage or pipe 59 extends through the engine crank case 60 as shown by dotted lines, and its exhaust end opens to the atmosphere at 61. The pipe 59 therefore constitutes a heater for heating the lubricating oil since it passes through that portion of the crank case where the oil is stored. The exhaust end of this passage 59 may be connected to the main exhaust passage 6 in a manner similar to that of the pipe 13 when desired. The valve 62 provides means to close off the exhaust heat from going to the crank case when desired. This means for heating the oil is simple and prevents the oil thickening up, and thaws the ice in the crank case.

When it is desired to install the damper 15 in the exhaust pipe of an engine already in use, the exhaust pipe 6 may be cut, as shown in Fig. 4, and a section removed. A thimble comprising the central portion 64 and the hubs 65 then replaces the cut-out part of the pipe, the damper 15 and its operating mechanism being already in place when the thimble is installed.

The design of stove or air heater employed in connection with this invention may vary widely from that of the stove 5, it being understood that this air heater merely illustrates a simple form of heater, suitable for heating the air.

The details of construction and the proportions of the parts may all be changed without departing from the spirit of my invention as set forth in the following claims.

I claim:—

1. In combination with an internal combustion engine, an intake passage and an exhaust passage communicating with said engine, means for throttling said intake passage, a valve in said exhaust passage, means for supplying fuel to said intake passage, a heater for heating said intake passage between said fuel supply means and said engine, a duct for supplying exhaust gases from said exhaust passage to said heater, said duct connecting to said exhaust passage on the engine side of said valve so that the latter may be operated to accelerate the flow of exhaust gases to said heater, an air heater heated by the exhaust gases from said engine, means for supplying warm air from said air heater to said intake passage, an air admission device to admit air to said intake passage anterior to said fuel supply means for regulating the temperature of said air supply, and means controlling said air admission device irrespective of said throttling means.

2. The combination with an internal combustion engine, an exhaust passage and an intake passage communicating with said engine, means for throttling said intake passage, a valve in said exhaust passage, means for supplying fuel to said intake passage, a heater for heating said intake passage between said fuel supply means and said engine, a duct for supplying exhaust gases from said exhaust passage to said heater, said duct connecting to said exhaust passage on the engine side of said valve so that the latter may be operated to increase the flow of exhaust gases to said heater, an air heater positioned adjacent said exhaust passage on the engine side of said valve, means for supplying warm air from said air heater to said intake passage, an air admission device to admit air to said intake passage anterior to said fuel supply means for regulating the temperature of said air supply, and means controlling said air admission device irrespective of said throttling means.

3. In combination with an internal combustion engine, an intake passage and an exhaust passage communicating with said engine, means for throttling said intake passage, a valve in said exhaust passage, means for supplying fuel to said intake passage, a heater for heating said intake passage between said fuel supply means and said engine, a duct for supplying exhaust gases from said exhaust passage to said heater, said duct connecting to said exhaust passage at a point on the engine side of said valve so that the latter may be operated to accelerate the flow of exhaust gases to said heater, an air heater heated by the exhaust gases from said engine, means for supplying warm air from said air heater to said intake passage, and additional means to vary the heating effect of the first mentioned heater.

4. The combination with an internal combustion engine, an exhaust passage and an intake passage communicating with said engine, means for throttling said intake passage, a valve in said exhaust passage, means for supplying fuel to said intake passage, a heater for heating said intake passage between said fuel supply means and said engine, a duct for supplying exhaust gases from said exhaust passage to said heater, said duct connecting to said exhaust passage on the engine side of said valve so that the latter may be operated to increase the flow of exhaust gases to said heater, an air heater positioned adjacent said exhaust passage on the engine side of said valve, means for supplying warm air from said air heater to said intake passage, and additional means to vary the heating effect of the first mentioned heater.

5. The combination with an internal combustion engine, an exhaust passage and an intake passage communicating with said engine, means for supplying fuel to said intake passage, a heater for heating said intake passage between said fuel supply means and said engine, a valve in said exhaust passage, means connecting said heater with said exhaust passage on opposite sides of said valve so that exhaust gases may flow through said heater and by-pass said valve, means for operating said valve to increase the heating effect of said heater, an air heater positioned adjacent said exhaust passage on the engine side of said valve, and means for supplying warm air from said air heater to said intake passage.

6. The combination with an internal combustion engine, an exhaust and an intake passage communicating with said engine, means for supplying fuel to said intake passage, a heater for heating said intake passage between said fuel supply means and said engine, a valve in said exhaust passage, means connecting said heater with said exhaust passage on opposite sides of said valve so that exhaust gases may flow through said heater and by-pass said valve, means for operating said valve to increase the heating effect of said heater, an air heater positioned adjacent said exhaust passage on the engine side of said valve, means for supplying warm air from said air heater to said intake passage, and additional means for varying the heating effect of said first mentioned heater.

7. The combination with an internal combustion engine, an exhaust passage and an intake passage communicating with said engine, means for supplying fuel to said intake passage, a heater for heating said intake passage between said fuel supply means and said engine, a valve in said exhaust passage, means connecting said heater with said exhaust passage on opposite sides of said valve so that exhaust gases may flow through said heater and by-pass said valve, means for operating said valve to increase the heating effect of said heater, an air heater positioned adjacent said exhaust passage on the engine side of said valve, means for supplying warm air from said air heater to said intake passage, and an additional valve to control the flow of exhaust gases to said first mentioned heater.

8. The combination with an internal combustion engine, an exhaust passage and an intake passage communicating with said engine, a valve in said exhaust passage, a charge forming device for supplying explosive fluid to said intake passage, means for throttling the flow of fluid through said intake passage, means for supplying warm air to said charge forming device, said latter means including an air heater positioned adjacent said exhaust passage on the engine side of said valve, means positioned between said charge forming device and said air heater for regulating the temperature of said air supply, means controlling said latter means irrespective of said throttling means, means for muffling the exhaust gases when said valve is open, and means for operating said valve so that it will retard the flow of exhaust gases and thereby materially increase the heating effect of said air heater.

9. The combination with an internal combustion engine, an exhaust passage and an intake passage communicating with said engine, means for throttling said intake passage, means for supplying fuel to said intake passage, a heater for heating said intake passage between said fuel supply means and the engine, a duct for supplying exhaust gases from said exhaust passage to said heater, a valve in said exhaust passage, means for supplying warm air to said intake passage, said latter means including an air heater positioned adjacent said exhaust passage on the engine side of said valve, means for operating said valve and said throttling means jointly so that when the throttling means is operated to decrease the flow of fluid to the engine said valve will partially close to retard the flow of exhaust gases and simultaneously accelerate the heating of both of said heaters, an air admission device positioned between said air heater and said fuel supply means for regulating the temperature of said air supply, and means controlling said air admission device irrespective of said throttling means.

10. The combination with an internal combustion engine, an exhaust passage and an intake passage communicating with said engine, a valve in said exhaust passage for throttling the flow of exhaust gases, a valve in said intake passage for throttling the flow of fluid to the engine, means for jointly operating said valves, means for varying the ratio of movement of said valves in relation to each other, a charge forming device forming a part of said intake passage, and means for supplying heated air to said charge forming device, said latter means including an air heater positioned adjacent said exhaust passage at a point between said exhaust throttling valve and the engine, said exhaust throttling valve being so positioned and arranged that it may be operated to retard the flow of exhaust gases and thereby accelerate the heating of said air heater, and means for automatically opening said valve when the latter is disengaged from said operating means.

11. The combination with an internal combustion engine, an exhaust passage and an intake passage communicating with said engine, a valve in said exhaust passage for throttling the flow of exhaust gases, a valve in said intake passage for throttling the flow of fluid to the engine, means for jointly operating said valves, said latter means being so arranged that the valve in said intake passage has some opening movement without moving the valve in said exhaust passage.

12. The combination with an internal combustion engine, an exhaust passage and an intake passage communicating with said engine, a heater for the intake passage, means for supplying exhaust gases to said heater, a valve in said exhaust passage for throttling exhaust gases, means for operating said valve to increase the flow of exhaust gases to said heater, and a spring tending to open said valve when the latter is disengaged from its operating means.

13. The combination with an internal combustion engine, an exhaust passage communicating with said engine, said exhaust passage being capable of conveying the major portion of the exhaust gases away from the engine, a charge forming device for supplying explosive fluid to said engine, means for throttling the flow of said explosive fluid, means for supplying warm air to said charge forming device including an air heater, means for supplying exhaust gases from said engine to said air heater, means for regulating the temperature of said air supply including an air admission device positioned between said air heater and said charge forming device, means controlling said air admission device irrespective of said throttling means, a valve in said exhaust passage to throttle the exhaust gases, means for operating said valve to vary the heating effect of said air heater, and means for muffling the exhaust gases when said valve is open.

14. The combination with an internal combustion engine, an exhaust passage and an intake passage communicating with said engine, means for throttling the flow of fluid through said intake passage, a valve in said exhaust passage, means for supplying warm air to said intake passage including a passage for the flow of air adjacent said exhaust passage on the engine side of said valve, means for jointly operating said valve and said throttling means so that when said throttling means is operated to decrease the flow of fluid through said intake passage said valve will partially close and retard the flow of exhaust gases to heat said air supply, means for varying the ratio of movement of said valve and said throttling means in relation to each other, and means for holding said valve open when it is disengaged from said operating means.

15. The combination with an internal combustion engine, an exhaust passage and an intake passage communicating with said engine, means for throttling said intake passage, means for supplying fuel to said intake passage, a valve in said exhaust passage, an air heater positioned adjacent said exhaust passage on the engine side of said valve, means for jointly operating said valve and said throttling means so that when said throttling means is operated to decrease the flow of fluid to the engine said valve will partially close and retard the flow of exhaust gases to heat said air heater, means for supplying warm air from said air heater to said intake passage, temperature regulating means positioned between said air heater and said fuel supply means for regulating the temperature of said air supply, and means controlling said temperature regulating means irrespective of said throttling means.

16. The combination with an internal combustion engine, an exhaust passage and an intake passage communicating with said engine, means for throttling said intake passage, means for supplying fuel to said intake passage, a heater for heating said intake passage at a point between said fuel supply means and the engine, a duct for supplying exhaust gases to said heater from said exhaust passage, means for regulating the flow of exhaust gases to said heater, a valve in said exhaust passage, means for supplying warm air to said intake passage, said latter means including an air heater positioned adjacent said exhaust passage on the engine side of said valve, means for operating said valve and said throttling means jointly so that said valve will be partially closed to retard the flow of exhaust gases and simultaneously accelerate the heating of both of said heaters when the engine is running at slow speed with said throttling means partially closed.

17. The combination with an internal combustion engine, an exhaust passage and an intake passage communicating with said engine, means for throttling said intake passage, means for supplying fuel to said intake passage, a heater for heating said intake passage at a point between said fuel supply means and the engine, a duct for supplying exhaust gases to said heater from said exhaust passage, means for regulating the flow of exhaust gases to said heater, a valve in said exhaust passage, means for supplying warm air to said intake passage, said latter means including an air heater positioned adjacent said exhaust passage on the engine side of said valve, means for operating said valve and said throttling means jointly so that said valve will be partially closed to retard the flow of exhaust gases and simultaneously accelerate the heating of both of said heaters when the engine is running at slow speed with said throttling means partially closed, and means for regulating the relative positions of said valve and said throttling means with respect to each other.

18. The combination with an internal combustion engine, an exhaust passage and an intake passage communicating with said engine, means for throttling said intake passage, means for supplying fuel to said intake passage, a heater for heating said intake passage between said fuel supply means and the engine, a duct for supplying exhaust gases to said heater from said exhaust passage, a valve in said exhaust passage, means for supplying warm air to said intake passage, said latter means including an air heater positioned adjacent said exhaust passage on the engine side of said valve, means for operating said valve to retard the flow of exhaust gases and thereby simultaneously accelerate the heating of both of said heaters, means for regulating the temperature of said air supply, means controlling the latter means irrespective of said throttling means, and means for muffling the exhaust gases when said valve is open.

19. In combination, an exhaust passage having communication with an internal combustion engine, a charge forming device for supplying explosive fluid to said engine, means for throttling said explosive fluid, a valve in said exhaust passage, means for supplying warm air to said charge forming device, said latter means including an air heater positioned adjacent said exhaust passage at a point on the engine side of said valve, means positioned between said heater and said charge forming device for regulating the temperature of said air supply, means controlling said latter means irrespective of said throttling means, means for operating said valve to retard the flow of exhaust gases and thereby accelerate the heating of said air heater, means for muffling the exhaust gases when said valve is open, and said exhaust passage being capable of conveying the major portion of the exhaust gases away from the engine when the latter is running at high speed.

20. The combination with an internal combustion engine, an exhaust passage and an intake passage communicating with said engine, means for supplying fuel to said intake passage, a heater for heating said intake passage between said fuel supply means and said engine, a valve in said exhaust passage, means connecting said heater with said exhaust passage on opposite sides of said valve so that exhaust gases may flow through said heater and by-pass said valve, means for operating said valve to increase the heating effect of said heater, an air heater heated by the exhaust gases from said engine, and means for supplying warm air from said air heater to said intake passage.

21. The combinaiton with an internal combustion engine, an exhaust passage and an intake passage communicating with said engine, means for supplying fuel to said intake passage, a heater for heating said intake passage between said fuel supply means and said engine, a valve in said exhaust passage, means connecting said heater with said exhaust passage on opposite sides of said valve so that exhaust gases may flow through said heater and by-pass said valve, means for operating said valve to increase the heating effect of said heater, an air heater heated by the exhaust gases from said engine, means for supplying warm air from said air heater to said intake passage, and an additional valve to control the flow of exhaust gases to said first mentioned heater.

22. The combination with an internal combustion engine, an exhaust passage and an intake passage communicating with said engine, a valve in said exhaust passage for throttling the flow of exhaust gases, a valve in said intake passage for throttling the flow of fluid to the engine, means for jointly operating said valves, a charge forming device forming a part of said intake passage, means for supplying heated air to said charge forming device, said latter means including an air heater positioned adjacent said exhaust passage at a point between said exhaust throttling valve and the engine, said exhaust throttling valve being so positioned and arranged that it may be operated to retard the flow of exhaust gases and thereby accelerate the heating of said air heater, and means for holding said valve in the exhaust passage open when said valve is disengaged from said operating means.

WILLIAM S. GUTHRIE.